United States Patent [19]

Green

[11] Patent Number: 4,474,665

[45] Date of Patent: Oct. 2, 1984

[54] USE OF GROUND, SIZED COCOA BEAN SHELLS AS A LOST CIRCULATION MATERIAL IN DRILLING MUD

[75] Inventor: Peter C. Green, Ellicott City, Md.

[73] Assignee: W. R. Grace & Co., New York, N.Y.

[21] Appl. No.: 306,218

[22] Filed: Sep. 28, 1981

[51] Int. Cl.³ .............................................. C09K 7/02
[52] U.S. Cl. ................................. 252/8.5 LC; 175/72
[58] Field of Search .................... 252/8.5 LC; 175/72; 524/15; 426/630, 631

[56] References Cited

U.S. PATENT DOCUMENTS

| | | | |
|---|---|---|---|
| 1,807,082 | 5/1931 | Boynton | 252/8.5 X |
| 2,440,789 | 5/1948 | Van der Pyl | 524/15 X |
| 2,779,417 | 1/1957 | Clark et al. | 252/8.5 X |
| 2,943,680 | 7/1960 | Scott et al. | 252/8.5 X |
| 3,574,099 | 4/1971 | Ryals et al. | 252/8.5 |
| 4,070,487 | 1/1978 | Trout et al. | 426/631 X |
| 4,156,030 | 5/1979 | Eggen | 426/429 X |

*Primary Examiner*—Herbert B. Guynn
*Attorney, Agent, or Firm*—Howard J. Troffkin

[57] ABSTRACT

A lost circulation controller for use in drilling fluids formed from cocoa bean shell material having a particle size distribution from 2 to 100 mesh (U.S. Std.) with at least about 25 percent by weight of said particulate material being from 2 to 10 mesh (U.S. Std.).

8 Claims, No Drawings

USE OF GROUND, SIZED COCOA BEAN SHELLS AS A LOST CIRCULATION MATERIAL IN DRILLING MUD

BACKGROUND OF THE INVENTION

Bore holes, such as oil well bore holes, are usually drilled by the rotary method in which a drilling fluid is circulated in the bore hole during the drilling operation. The presence of a drilling fluid is required to act as coolant for the drill bit and drill stem, to act as carrier for the cuttings and to provide hydraulic pressure to prevent blowout. Subterranean formations through which the bore hole is being drilled often presents conditions which cause whole drilling fluid (commonly known as "mud") to be lost. Such conditions are generally classified as either of a macroporosity type, e.g. loosely consolidated sandy formations, or of a macroscopic fracture type, e.g. crevices directed away from the bore hole. The loss of whole mud via either of these two conditions is known as lost circulation.

Loss of whole mud is an extremely undesirable phenomenon as it can (1) lead to poor circulation and, therefore, less efficient removal of cuttings, (2) require additional cost in rig time, manpower and material to replenish the lost mud and restore circulation and, in extreme cases, (3) lead to insufficient downhole hydrostatic pressure and to a blowout.

Materials used to stop lost circulation are known as lost circulation controllers or additives. Current lost circulation controllers are generally divided into three different categories: fibers, flakes and granules. Each category is believed useful with respect to a specific type of formation. Materials which are in the form of fibers or flakes are presently used to seal macroporous formations. Examples of fibrous material commonly used includes cedar fibers and bagasse. Examples of flake material commonly used includes paper, mica and cottonseed hulls. Granular materials, such as ground walnut or pecan shells, are commonly used to plug fractures. Therefore, circulation control using presently known materials requires knowledge of the nature of the subterranean formation and/or the use of various types or combinations of material until mud circulation is substantially restored.

Tests have been devised to determine the usefulness of a particular material as a control additive with respect to each of the two types of lost circulation causing formations. The "slot test" is a standard test used to determine control properties with respect to fractures. This test observes the ability of a mud which is under pressure (simulating bore hole pressure) containing the control candidate to plug a slit of predetermined dimension. The "shot bed test" observes the ability of a mud to plug macroporous formations by having mud containing the control candidate to attempt to pass through a column of shot of standard size.

U.S. Pat. Nos. 2,943,679 and 2,943,680 describe the use of hard portions of certain nut shells which have been ground to a granular form as being useful as a lost circulation controller with respect to fractures. U.S. Pat. No. 3,629,102 discloses that certain specific mixtures of both fibrous and granular materials can be used as a lost circulation controller for both fracture and macroporosity loss.

It is highly desired to have a single material which can be used as universal lost circulation controller for both fracture and macroporosity loss. Such a material would alleviate the present requirement for detailed knowledge of the subterranean formation, stocking of different types of material for proper application and for application of different types of material, singly or in combination, to try to control fluid loss by trial and error.

SUMMARY OF INVENTION

The present invention is directed to a single material which provides fluid loss control against both fracture and macroporosity. The subject material is cocoa bean shells formed into particulate material of specific particle size distribution of from 2 to 100 mesh with at least 25 and preferably at least 40 percent by weight of said material being from 2 to 10 mesh.

DETAILED DESCRIPTION OF INVENTION

The present invention is directed to a single material unexpectedly found to be universally useful as a fluid loss controller with respect to both macroporous and fractured subterranean formations. Such material eliminates the conventional necessity for maintaining stock of various types of materials, the need to determine the type of formation which is causing the defect, and/or the use of a multicomponent controller.

It has been presently unexpectedly found that particulate material formed from cocoa bean shells of certain particle size and distribution acts as a universal lost circulation controller. The cocoa bean shell material useful for the stated purpose should be of particle sizes of from 2 to 100 mesh (all mesh sizes used in the description of this invention are in terms of U.S. Standard Sieve Series, Fine Series of 1940) with at least 25 and preferably at least 40 percent by weight of the particulate cocoa bean shell material having a particle size within the range of from 2 to 10 mesh. It is preferred that the upper percentage of the 2 to 10 mesh material be 80 weight percent and most preferably 70 weight percent. The remainder of the subject particulate cocoa bean shell material should be within the range of from greater than 10 to 100 mesh and substantially evenly distributed throughout this particle size range. It is most preferred that the subject particulate material have a distribution such that at least 40 percent (wt.) is between 2 and 10 mesh; at least 7 percent (wt.) is in each of the next four 10 mesh increments and the remainder is distributed in the 50 to 100 mesh increment.

It is realized that some extraneous material of either a smaller or a larger particle size than described above may be present to a small degree but should not be present in amounts of greater than about 5 percent of the total weight of cocoa bean shell particulate material. Any such extraneous material should not be used in determining the proper particle size distribution as described hereinabove.

Although other seed shell materials have been utilized as lost circulation controllers, each of these materials has not been found to have universal application with respect to both types of lost circulation problems. The use of cocoa bean shells in the form of particulate material of the particle size distribution described above has, however, been unexpectedly found to provide such universal application.

The subject material can be readily formed by the use of conventional processing methods in manners well known to those skilled in the art. For example, cocoa bean shells can be subjected to grinding or mastication using conventional equipment to form particulate matter. The resultant material can then be passed through a series of standardized mesh screens to obtain material of proper mesh size distribution as described above.

The particles formed from cocoa bean shells are, in general, of an irregular dimension and have an average dimension with respect to one axis which is substantially smaller than the average dimension of the particle along each of the remaining two axis. The particle's smallest average dimension with respect to one axis of orientation is generally less than one-half of its longest average dimension with respect to one of the two remaining axis of orientation. It is believed that cocoa bean shells are of a structure which, upon grinding or other particle forming process, delaminate to the unique irregular dimensional structure observed. Further, it is observed that the particles of cocoa bean shells have surfaces which generally contains peaks, ridges, knobs and the like configurations on their surface.

It is believed, although not meant to be a limitation on the subject invention or the claims appended hereto, that a reason for the universal lost circulation control properties of the present material resides in the particular nature of cocoa bean shells which form particle surfaces of irregular dimension and design. It is suggested that these irregular characteristics cause the particles to exhibit lost circulation control both of conventional granular and conventional flake type materials.

The subject lost circulation control material can be added to the fluid media of the mud either separately or as a mixture with other solids, such as clays, polymers, weighting agents, etc., used to form the mud compositions in conventional methods. Alternatively, it can be added as a solid to preformed mud or as part of make-up mud composition. The subject particulate lost circulation controller should be present in from 2 to 40, and preferably 10–30 pounds per barrel (42 gal.) of drilling mud. The mud should have an alkaline pH and preferably a pH of at least about 8.

Alternately, the subject lost circulation controller can be used by making up a set amount, such as 100 barrels, of mud which contains the controller at the concentrations described above, removing the drill bit from the drilling string, placing the end of the drill pipe adjacent to the suspected lost circulation zone and pumping the controller containing mud down to the zone. The mud circulation is stopped and the level of the mud is observed over several hours to ensure achievement of lost circulation control.

The following examples are given for illustrative purposes only and are not meant to be a limitation on the invention as defined by the claims appended hereto. All parts and percentages are by weight unless otherwise stated.

EXAMPLE I

A base mud was prepared using a commercially available viscosifier, sodium bentonite. The bentonite was added to water under high speed stirring. The mud was allowed to stand overnight and then adjusted to an apparent viscosity of 95±5 cp.

Cocoa bean shells were ground using a 24 inch single runner attrition mill. The material was passed through a series of U.S. Standard Series sieves of the Fine Series and the separate portions were recombined to give a mixture having a particle size range of from 4 to 100 mesh in the following proportions: 4–6 mesh=16%; 6–10 mesh=35%; 10–20 mesh=8% 20–30 mesh=10%; 30–40 mesh=7%; 40–50 mesh=12%; and 60–100 mesh=11%. The ground and sized cocoa bean shell material was microscopically observed to be of irregular shape with a surface having a number of "hills", "knobs" and "ridges" and that the particles were generally of a configuration in which one dimension was substantially smaller than the other. Such geometric observation was independent of the mode of forming the particulate material.

The shot bed test cell consisted of a tail filter cell in which the bottom had a 3/16 inch ID outlet. A 14 mesh screen was placed on the bottom of the cell and covered with a 0.75 inch bed of No. 8 lead shot. This cell simulated sealing characteristics in a macroporous formation. The slot test cell was formed from a tall filter cell in which the bottom contained a slot 2 inches long, 0.25 inch deep and adjusted to a width of 0.05 inch. This cell simulated sealing characteristics with respect to a fractured formation.

Separate 500 ml samples containing varying amounts of the particulate cocoa bean shell mixture described above were each tested for their lost circulation control characteristics. Each sample was introduced into a fresh cell, applying 100 psi pressure ($N_2$) and observing the time to seal the cell and the volume of mud collected prior to seal. Table I contains the results:

TABLE I

| Slot Test | | | | |
|---|---|---|---|---|
| Conc. lb/bbl | 2 | 5 | 10 | 20 |
| Vol. @ Shutoff (ml) | 185 | 90 | 66 | 30 |
| Time @ Shutoff (sec) | 5 | 3 | 3 | 3 |
| Shot Bed Test | | | | |
| Conc. lb/bbl | 20 | 25 | 30 | |
| Vol. @ Shutoff (ml) | 132 | 97 | 82 | |
| Time @ Shutoff (sec) | 6 | 5 | 4 | |

The above data show that the subject particulate material acts as a good lost circulation controller for both macroscopic fractures (Slot Test) and macroporosity (Shot Bed Test). Good (low) shutoff times and volumes at shutoff were observed.

EXAMPLE II

A sample of particulate cocoa bean shell material was formed and tested in the same manner as described in Example I above except that the particle size distribution of the material was: 4 to 10 mesh=27%; 10 to 30 mesh=54%; 30 to 100 mesh=17%. The results of both the slot test and the shot bed test are given in Table II below:

TABLE II

| Slot Test | | | |
|---|---|---|---|
| Conc. lb/bbl | 5 | 10 | 15 |
| Vol. @ Shutoff (ml) | 132 | 100 | 32 |
| Time @ Shutoff (sec) | 5 | 5 | 2 |
| Shot Bed Test | | | |
| Conc. lb/bbl | 20 | 30 | 35 |
| Vol. @ Shutoff (ml) | 200 | 118 | 52 |
| Time @ Shutoff (sec) | 7 | 4 | 3 |

EXAMPLE III

A series of comparative samples were prepared from cocoa bean shell particulate material having a random (as ground) particle size distribution and from another having no material below 10 mesh therein. The particle size distributions of the samples are given below:

| Mesh Size | Sample A % | Sample B % |
| --- | --- | --- |
| 4–10 | 5 | — |
| 10–20 | 11 | 25 |
| 20–30 | 7 | 25 |
| 30–40 | 45 | 25 |
| 40–60 | 33 | 14 |
| 60–100 | 1 | 11 |

Each sample was used in different concentrations in the sodium bentonite mud in the same manner as described in Example I above. The cocoa bean shell containing muds were tested as described in Example I. The results are shown in Tables III and IV below:

TABLE III

| Sample A Containing Mud | | | | |
| --- | --- | --- | --- | --- |
| Slot Test | | | | |
| Conc. | 5 | 10 | 15 | 20 |
| Vol. | 177 | 128 | 75 | 84 |
| Time | 4 | 4 | 6 | 7 |
| Shot Bed Test | | | | |
| Conc. | 15 | 18 | 20 | |
| Vol. | 148 | 122 | 101 | |
| Time | 11 | 12 | 10 | |

Comparison of these muds with those in Table I show that the muds of the present invention exhibit superior universal and individual lost circulation control properties (Table I) than attained above. For example, at 20 ppb, the muds having the controller of this invention (Table I) is about 2.5 times as effective for fractures and gives better seal time for macroporosity.

TABLE IV

| Sample B Containing Mud | | | | |
| --- | --- | --- | --- | --- |
| Slot Test | | | | |
| Conc. | 5 | 10 | 20 | 30 |
| Vol. | * | * | 176 | 100 |
| Time | * | * | 5 | 8 |
| Shot Bed Test | | | | |
| Conc. | 17 | 18 | 19 | |
| Vol. | 114 | 101 | 80 | |
| Time | 5 | 5 | 8 | |

*Lost circulation control not exhibited within framework of test.

Comparison of the results (Table IV) of the above muds with the results attained using the present invention show unexpected superiority of the latter. For example, the muds of Table I, when directly compared with those of Table III (at 20 ppb), show far superior control properties to fractures (Slot Test) and superior seal time for macroporosity (Shot Bed Test).

EXAMPLE IV

A commercially available lost circulation controller (Kwik-Seal) which is formed from a mixture of ground nut shells, nut shell flour and sugar cane fiber such as described in U.S. Pat. No. 3,629,102 to provide a universal controller was tested, for comparative purposes, in the same manner as described in Example I above. The results showed that the single material controller of the present invention has substantially similar abilities as that of the commercial product.

While the invention has been described in connection with certain preferred embodiments, it is not meant to limit the invention to the particular forms set forth, but, on the contrary, it is intended to cover such alternatives, modifications and alternatives as defined by the appended claims.

What is claimed is:

1. A drilling fluid additive suitable for lost circulation control comprising particulate material formed from cocoa bean shells, said material having a particle size distribution of from 2 to 100 mesh (U.S. Standard Sieve Size) with at least 25 percent by weight of the total weight of said material being from 2 to 10 mesh (U.S. Standard Sieve Size).

2. The drilling fluid additive of claim 1 wherein at least 50 percent of said particulate cocoa bean shell material is of a particle size of from 2–10 mesh (U.S. Std.).

3. A drilling fluid additive of claim 1 wherein said particulate cocoa bean shell material is in particulate form that its average dimension along one axis is less than half of the average longest dimension.

4. The drilling fluid additive of claim 1 which further contains an agent capable of maintaining a pH of at least about 8.

5. A drilling fluid suitable for circulating in a bore hole during bore hole drilling operation comprising an alkaline fluid composition containing a drilling fluid viscosifier and an effective amount to substantially inhibit fluid loss control of a particulate cocoa bean shell material of claim 1 or 2.

6. The drilling fluid of claim 5 wherein said cocoa bean shell material is present in from about 2 to 40 pounds per barrel of drilling fluid.

7. The drilling fluid of claim 6 wherein said cocoa bean shell material is present in from about 10 to 40 pounds per barrel.

8. A process of drilling a hole into a subterranean formation using conventional bore hole drilling equipment and drilling fluid, the improvement comprising circulating while drilling, an alkaline drilling fluid having the lost circulation controller of claims 1, 2, 3 or 4 substantially uniformly distributed in same fluid.

* * * * *